US011758005B2

(12) United States Patent
Kumar et al.

(10) Patent No.: US 11,758,005 B2
(45) Date of Patent: *Sep. 12, 2023

(54) SERVICE PROVIDER USER ACCOUNTS

(71) Applicant: Sonos, Inc., Santa Barbara, CA (US)

(72) Inventors: Abhishek Kumar, Santa Barbara, CA (US); Ron Kuper, Arlington, MA (US); Jason Kendall, Pawtucket, RI (US); Emilio Arce, Cambridge, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,915

(22) Filed: Dec. 15, 2022

(65) Prior Publication Data

US 2023/0179666 A1 Jun. 8, 2023

Related U.S. Application Data

(63) Continuation of application No. 17/515,650, filed on Nov. 1, 2021, now Pat. No. 11,533,378, which is a (Continued)

(51) Int. Cl.
*H04L 29/08* (2006.01)
*G06F 16/435* (2019.01)
(Continued)

(52) U.S. Cl.
CPC ............. *H04L 67/306* (2013.01); *G06F 3/16* (2013.01); *G06F 16/437* (2019.01); *G06F 21/62* (2013.01);
(Continued)

(58) Field of Classification Search
CPC .... H04N 9/8205; H04N 21/812; H04N 21/84; H04L 65/4084; H04L 67/06; G06F 17/3002; G06F 3/165; G05B 15/02
(Continued)

(56) References Cited

U.S. PATENT DOCUMENTS 5,440,644 A 8/1995 Farinelli et al.
5,553,147 A 9/1996 Pineau
(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

Audio Tron Quick Start Guide, Version 1.0, Mar. 2001, 24 pages.
(Continued)

*Primary Examiner* — Tauqir Hussain
(74) *Attorney, Agent, or Firm* — Fortem IP LLP; Benjamin M. Urban

(57) ABSTRACT

Examples described herein involve switching between two user accounts of a streaming media service. In an example implementation, a playback device stores data representing credentials for multiple user accounts including a first user account of a first streaming audio service and a second user account of the first streaming audio service. The playback device receives instructions to play first audio content from the first streaming audio service and plays back the first audio content by streaming data representing the first audio content from one or more servers of the first streaming audio service using credentials of the first user account. The playback device detects a trigger associated with the first user account of the first streaming audio service and switches from streaming data representing the first audio content using credentials of the first user account to streaming data representing the first audio content using credentials of the second user account.

20 Claims, 7 Drawing Sheets

US 11,758,005 B2

Page 2

Related U.S. Application Data continuation of application No. 16/713,791, filed on Dec. 13, 2019, now Pat. No. 11,165,882, which is a continuation of application No. 15/341,546, filed on Nov. 2, 2016, now Pat. No. 10,511,685, which is a continuation of application No. 14/501,947, filed on Sep. 30, 2014, now Pat. No. 9,521,212.

(51) Int. Cl.

| | | |
|---|---|---|
| G06F 3/16 | (2006.01) | |
| H04L 29/06 | (2006.01) | |
| H04N 21/4627 | (2011.01) | |
| H04L 67/306 | (2022.01) | |
| H04L 65/60 | (2022.01) | |
| G06F 21/62 | (2013.01) | |

(52) U.S. Cl.
CPC ......... *H04L 65/60* (2013.01); *H04N 21/4627* (2013.01)

(58) Field of Classification Search
USPC ........................................................ 709/219
See application file for complete search history.

(56) References Cited

U.S. PATENT DOCUMENTS

| | | | |
|---|---|---|---|
| 5,761,320 A | 6/1998 | Farinelli et al. | |
| 5,923,902 A | 7/1999 | Inagaki | |
| 6,032,202 A | 2/2000 | Lea et al. | |
| 6,256,554 B1 | 7/2001 | DiLorenzo | |
| 6,404,811 B1 | 6/2002 | Cvetko et al. | |
| 6,469,633 B1 | 10/2002 | Wachter | |
| 6,505,169 B1* | 1/2003 | Bhagavath | G06Q 30/02 |
| | | | 705/14.66 |
| 6,522,886 B1 | 2/2003 | Youngs et al. | |
| 6,611,537 B1 | 8/2003 | Dens et al. | |
| 6,631,410 B1 | 10/2003 | Kowalski et al. | |
| 6,757,517 B2 | 6/2004 | Chang | |
| 6,778,869 B2 | 8/2004 | Champion | |
| 7,124,125 B2 | 10/2006 | Cook et al. | |
| 7,130,608 B2 | 10/2006 | Hollstrom et al. | |
| 7,130,616 B2 | 10/2006 | Janik | |
| 7,143,939 B2 | 12/2006 | Henzerling | |
| 7,236,773 B2 | 6/2007 | Thomas | |
| 7,251,533 B2 | 7/2007 | Yoon et al. | |
| 7,295,548 B2 | 11/2007 | Blank et al. | |
| 7,383,036 B2 | 6/2008 | Kang et al. | |
| 7,394,480 B2 | 7/2008 | Song | |
| 7,483,538 B2 | 1/2009 | McCarty et al. | |
| 7,505,482 B2* | 3/2009 | Adamczyk | H04L 67/14 |
| | | | 370/252 |
| 7,571,014 B1* | 8/2009 | Lambourne | G06F 3/165 |
| | | | 700/94 |
| 7,607,091 B2 | 10/2009 | Song et al. | |
| 7,630,501 B2 | 12/2009 | Blank et al. | |
| 7,643,894 B2 | 1/2010 | Braithwaite et al. | |
| 7,657,910 B1 | 2/2010 | McAulay et al. | |
| 7,788,581 B1* | 8/2010 | Bauermeister | G06F 40/169 |
| | | | 715/244 |
| 7,827,298 B2* | 11/2010 | Black | H04L 67/28 |
| | | | 709/231 |
| 7,853,341 B2 | 12/2010 | McCarty et al. | |
| 7,877,511 B1* | 1/2011 | Berger | H04L 67/16 |
| | | | 709/242 |
| 7,987,294 B2 | 7/2011 | Bryce et al. | |
| 8,014,423 B2 | 9/2011 | Thaler et al. | |
| 8,045,952 B2 | 10/2011 | Qureshey et al. | |
| 8,103,009 B2 | 1/2012 | Mccarty et al. | |
| 8,234,395 B2 | 7/2012 | Millington | |
| 8,239,546 B1* | 8/2012 | McGowan | H04L 29/08639 |
| | | | 709/227 |
| 8,326,951 B1* | 12/2012 | Millington | H04L 12/2809 |
| | | | 370/254 |
| 8,483,853 B1 | 7/2013 | Ambourne | |
| 8,503,991 B2* | 8/2013 | Swift | H04M 3/22 |
| | | | 455/67.11 |
| 8,516,093 B2 | 8/2013 | Bank | |
| 8,831,761 B2 | 9/2014 | Kemp et al. | |
| 8,832,564 B2* | 9/2014 | McCoy | G06F 3/162 |
| | | | 715/721 |
| 8,880,648 B1* | 11/2014 | Arora | H04N 21/44227 |
| | | | 709/229 |
| 9,025,939 B2* | 5/2015 | Kummer | H04N 21/64322 |
| | | | 386/292 |
| 9,402,093 B2* | 7/2016 | Lieu | H04N 21/25875 |
| 9,727,219 B2 | 8/2017 | Kumar et al. | |
| 9,979,761 B2* | 5/2018 | Wong | H04L 67/306 |
| 10,009,431 B2* | 6/2018 | Holtmanns | H04M 3/2281 |
| 10,083,439 B2* | 9/2018 | Turgeman | G06Q 20/308 |
| 10,511,685 B2* | 12/2019 | Kumar | G06F 21/62 |
| 2001/0042107 A1 | 11/2001 | Palm | |
| 2002/0022453 A1 | 2/2002 | Balog et al. | |
| 2002/0026442 A1 | 2/2002 | Lipscomb et al. | |
| 2002/0124097 A1 | 9/2002 | Isely et al. | |
| 2003/0157951 A1 | 8/2003 | Hasty, Jr. | |
| 2003/0227478 A1 | 12/2003 | Chatfield | |
| 2004/0024478 A1 | 2/2004 | Hans et al. | |
| 2006/0143236 A1 | 6/2006 | Wu | |
| 2006/0161621 A1 | 7/2006 | Rosenberg et al. | |
| 2007/0003067 A1 | 1/2007 | Gierl et al. | |
| 2007/0088747 A1 | 4/2007 | Cheng et al. | |
| 2007/0142944 A1 | 6/2007 | Goldberg et al. | |
| 2008/0144864 A1 | 6/2008 | Huon et al. | |
| 2008/0167027 A1* | 7/2008 | Gautier | H04W 4/00 |
| | | | 455/419 |
| 2009/0031424 A1* | 1/2009 | Ganesan | H04N 21/4331 |
| | | | 726/26 |
| 2009/0083117 A1 | 3/2009 | Svendsen et al. | |
| 2009/0138805 A1 | 5/2009 | Hildreth | |
| 2009/0150553 A1* | 6/2009 | Collart | H04L 65/612 |
| | | | 709/229 |
| 2009/0217316 A1* | 8/2009 | Gupta | H04L 65/607 |
| | | | 725/32 |
| 2010/0017366 A1 | 1/2010 | Robertson et al. | |
| 2010/0106848 A1* | 4/2010 | van Hoff | H04N 21/4858 |
| | | | 709/231 |
| 2010/0129057 A1* | 5/2010 | Kulkarni | H04N 5/765 |
| | | | 386/241 |
| 2010/0228740 A1 | 9/2010 | Cannistraro et al. | |
| 2010/0262909 A1 | 10/2010 | Hsieh | |
| 2010/0299639 A1* | 11/2010 | Ramsay | H04L 41/22 |
| | | | 715/835 |
| 2011/0066943 A1 | 3/2011 | Brillon et al. | |
| 2011/0246659 A1* | 10/2011 | Bouazizi | H04N 21/643 |
| | | | 709/231 |
| 2012/0005312 A1* | 1/2012 | McGowan | G06F 16/41 |
| | | | 709/219 |
| 2012/0005313 A1* | 1/2012 | McGowan | H04L 67/06 |
| | | | 709/219 |
| 2012/0028566 A1* | 2/2012 | Vorbau | G06F 16/68 |
| | | | 455/3.01 |
| 2012/0059707 A1 | 3/2012 | Goenka et al. | |
| 2012/0096526 A1 | 4/2012 | Brahmanapalli et al. | |
| 2012/0117587 A1* | 5/2012 | Pedlow | H04N 21/64322 |
| | | | 704/E11.001 |
| 2012/0210245 A1* | 8/2012 | McCoy | H04N 21/43615 |
| | | | 715/747 |
| 2013/0018960 A1 | 1/2013 | Knysz et al. | |
| 2013/0081110 A1 | 3/2013 | McGowan | |
| 2013/0179992 A1* | 7/2013 | Ziskind | G06F 21/10 |
| | | | 726/30 |
| 2013/0217366 A1* | 8/2013 | Kolodziej | H04W 4/80 |
| | | | 455/414.1 |
| 2013/0326041 A1 | 12/2013 | Bellet et al. | |
| 2014/0006483 A1* | 1/2014 | Garmark | H04L 65/4069 |
| | | | 709/203 |
| 2014/0120981 A1* | 5/2014 | King | G06V 30/1423 |
| | | | 455/556.1 |
| 2014/0168716 A1* | 6/2014 | King | G06F 16/5846 |
| | | | 358/473 |

(56) References Cited

U.S. PATENT DOCUMENTS

| | | | |
|---|---|---|---|
| 2014/0201635 A1* | 7/2014 | Kumar | H04N 21/4325 715/716 |
| 2014/0233755 A1 | 8/2014 | Kim et al. | |
| 2014/0344848 A1* | 11/2014 | Busse | H04N 21/462 725/28 |
| 2015/0067870 A1 | 3/2015 | Lee et al. | |
| 2015/0073574 A1* | 3/2015 | Brenner | H04N 21/41422 700/94 |
| 2015/0106887 A1* | 4/2015 | Aslund | H04W 12/06 726/5 |
| 2015/0163675 A1* | 6/2015 | Chang | H04W 4/12 455/411 |
| 2015/0199213 A1* | 7/2015 | Desai | G06F 9/468 718/102 |
| 2015/0347722 A1* | 12/2015 | Baumgartner | H04L 63/10 726/30 |
| 2018/0032751 A1* | 2/2018 | Barrilleaux | G06F 21/10 |

OTHER PUBLICATIONS

Audio Tron Reference Manual, Version 3.0, May 2002, 70 pages.
Audio Tron Setup Guide, Version 3.0, May 2002, 38 pages.
Bluetooth. "Specification of the Bluetooth System: The ad hoc Scatternet for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
European Patent Office, European Office Action dated Mar. 26, 2020, issued in connection with European Application No. 19160185.5, 5 pages.
European Patent Office, European Search Report dated Apr. 8, 2019, issued in connection with European Application No. 19160185.5, 8 pages.
European Patent Office, Office Action dated Jun. 7, 2017, issued in connection with European Application No. 15779116.1, 5 pages.
European Patent Office, Office Action dated Jan. 18, 2017, issued in connection with European Application No. 15779116.1, 6 pages.
European Patent Office, Summons to Attend Oral Proceedings dated Jan. 25, 2018, issued in connection with European Patent Application No. 15779116.1, 7 pages.
International Searching Authority, International Search Report and Written Opinion dated Dec. 11, 2015, issued in connection with International Application No. PCT/US2015/052943, filed Sep. 29, 2015, 13 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Feb. 13, 2019, issued in connection with U.S. Appl. No. 15/341,546, filed Nov. 2, 2016, 18 pages.
Non-Final Office Action dated Feb. 5, 2021, issued in connection with U.S. Appl. No. 16/713,791, filed Dec. 13, 2019, 14 pages.
Notice of Allowance dated Jun. 29, 2021, issued in connection with U.S. Appl. No. 16/713,791, filed Dec. 13, 2019, 9 pages.
Notice of Allowance dated Oct. 5, 2022, issued in connection with U.S. Appl. No. 17/515,650, filed Nov. 1, 2021, 9 pages.
Notice of Allowance dated Aug. 25, 2016, issued in connection with U.S. Appl. No. 14/501,947, filed Sep. 30, 2014, 22 pages.
Notice of Allowance dated Jul. 31, 2019, issued in connection with U.S. Appl. No. 15/341,546, filed Nov. 2, 2016, 8 pages.
Palm, Inc., "Handbook for the Palm VII Handheld," May 2000, 311 pages.
Preinterview First Office Action dated Jun. 30, 2016, issued in connection with U.S. Appl. No. 14/501,947, filed Sep. 30, 2014, 5 pages.
Presentations at WinHEC 2000, May 2000, 138 pages.
Tarjei et al., "Support Multiple Music Service Accounts", 2013, 5 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

\* cited by examiner

SERVICE PROVIDER USER ACCOUNTS

CROSS REFERENCE TO RELATED APPLICATIONS

This application claims priority under 35 U.S.C. § 120 to, and is a continuation of, U.S. non provisional patent application Ser. No. 17/515,650, filed on Nov. 1, 2021, entitled "Service Provider User Accounts," which is incorporated herein by reference in its entirety.

U.S. non provisional patent application Ser. No. 17/515,650 claims priority under 35 U.S.C. § 120 to, and is a continuation of, U.S. non-provisional patent application Ser. No. 16/713,791, filed on Dec. 13, 2019, entitled "Service Provider User Accounts," and issued as U.S. Pat. No. 11,165,882 on Nov. 2, 2021, which is incorporated herein by reference in its entirety.

U.S. non-provisional patent application Ser. No. 16/713,791 claims priority under 35 U.S.C. § 120 to, and is a continuation of, U.S. non-provisional patent application Ser. No. 15/341,546, filed on Nov. 2, 2016, entitled "Service Provider User Accounts," and issued as U.S. Pat. No. 10,511,685 on Dec. 17, 2019, which is incorporated herein by reference in its entirety.

U.S. non-provisional patent application Ser. No. 15/341,546 claims priority under 35 U.S.C. § 120 to, and is a continuation of, U.S. non-provisional patent application Ser. No. 14/501,947, filed on Sep. 30, 2014, entitled "Service Provider User Accounts," and issued as U.S. Pat. No. 9,521,212 on Dec. 13, 2016, which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from a plethora of sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
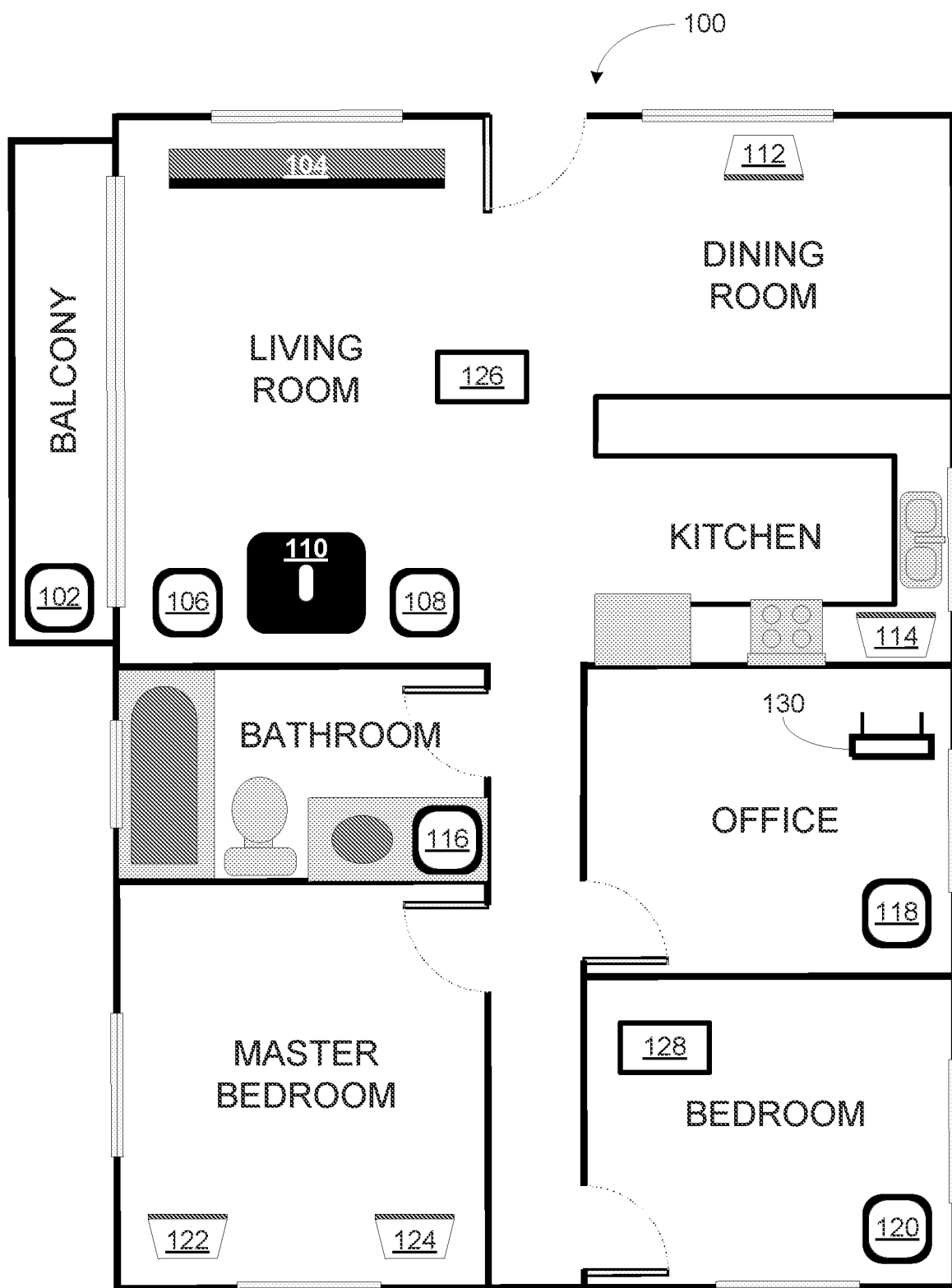
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

A media playback system may access media content available from a service provider using a user account for the service provider. The service provider may accordingly provide to the media playback system, media content based on access credentials of the user account. The media content may include media items identified based on media preferences, curated playlists, and/or custom playlists associated with the user account, among other examples.

In one case, the media playback system may be used by a plurality of users (i.e. roommates or members of a family). However, the user account via which the media playback system accesses the service provider may be a user account for a particular user of the plurality of users. In other words, the service provider may provide media content to the media playback system based on the user account of the particular user, even when another user of the plurality of users is using the media playback system.

Some examples described herein involve managing two or more user accounts via which a media playback system can access a service provider. Some examples also involve displaying on a graphical display, graphical representations of at least one of the two or more user accounts via which a media playback system can access a service provider.

In one example, data indicating one or more user accounts for one or more service providers may be stored and maintained on at least one device associated with the media playback system. The at least one device may include one or more playback devices in the media playback system, and/or one or more servers in communication with the media playback system.

The at least one device may maintain data indicating (i) a first user account for a service provider and (ii) a first priority indicator corresponding to the first user account. In one example, the first priority indicator may be a time stamp indicating when the first user account for the service provider was registered with the media playback system. In another example, the first priority indicator may be an incremental numeric value based on a number of user accounts previously registered with a media playback system.

The at least one device may subsequently receive data indicating a second user account for the same service provider. In one example, the data may be received in response to the second user account for the service provider being registered with the media playback system. Based on the received data, the at least one device may then determine a second priority indicator corresponding to the second user account. In one instance, the at least one device may determine the second priority indicator based on a time when the second user account was registered with the media playback system. In another instance, the at least one device may determine the second priority indicator based on the number of previously registered user accounts.

The at least one device may then cause to be stored, data indicating (i) the second user account for the service provider and (ii) the second priority indicator corresponding to the second user account. In one example, the at least one device may further transmit the data to be stored to one or more other devices associated with the media playback system. In one case, the at least one device may transmit the data responsive to receiving the data indicating the second user account for the service provider and determining the second priority indicator. In another case, the at least one device may transmit the data in response to a request for the data.

For instance, a network device, such as a controller device in communication with the media playback system, may request from the at least one playback device, data indicating one or more user accounts registered with the media playback system that the media playback system is configured to use when accessing media content from one or more service providers. In one example, a user may be using the network device to control the media playback system and may wish to cause the media playback system to play media content from one or more service providers, including the service provider mentioned above. Upon launching a software application that provides a controller interface for controlling the media playback system, the network device may transmit to the at least one device, a request for the data indicating one or more user accounts for one or more service providers.

Continuing with the example above, the data received by the network device from the at least one device may indicate at least (i) the service provider mentioned previously, (ii) the first user account for the service provider, and (iii) the second user account for the service provider, among other information relating to user accounts and service providers associated with the media playback system.

Based on the received data, the network device may identify, for each service provider, a default user account corresponding to the network device. For instance, the network device may identify the first user account as a default user account corresponding to the network device. In one example, the network device may identify the first user account as the default user account for the service provider based on the first priority indicator indicating a time stamp earlier than a time stamp indicated by the second priority indicator. In another example, the network device may identify the first user account as the default user account for the service provider based on the first priority indicator indicating a numeric value smaller than a numeric value indicated by the second priority indicator. In other words, in these examples, an earliest registered user account for the service provider may be identified as the default user account.

In some cases, the data received from the at least one device may further indicate additional information. For instance, the data may further indicate a respective device via which each user account was registered with the media playback system. In one example, if the data indicates that the network device is the device via which the first user account was registered with the media playback system, then the network device may accordingly determine that the first user account is the default user account.

Based on the determination that the first user account is the default user account corresponding to the network device, the first user account may then be configured to be an active user account of the service provider when the network device is used to access the media playback system. As the active user account, the first user account may be used by the media playback system to access the service provider if and when the media playback system accesses the service provider. Other examples are also possible.

The network device may then cause to be displayed on a graphical display, a graphical representation that indicates the first user account is the active user account. The graphical representation may be a part of the controller interface for controlling the media playback system. In one example, the graphical representation may be selectable to further browse and select media content from the service provider that is available via the first user account. In another example, the graphical representation that indicates the first user account is the active user account may also be selectable to change the active user account. Other examples are also possible.

As indicated above, the present discussions involve managing two or more user accounts via which a media playback system can access a service provider, and displaying on a graphical display, graphical representations of at least one of the two or more user accounts via which a media playback system can access a service provider. In one aspect, a device is provided. The device includes a processor and memory having stored thereon instructions executable by the processor to cause the device to perform functions. The functions include maintaining data indicating (i) a first user account for a service provider and (ii) a first priority indicator corresponding to the first user account, receiving data indicating a second user account for the service provider, based on the received data indicating the second user account for the service provider, determining a second priority indicator corresponding to the second user account, and causing to be stored, data indicating (i) the second user account for the service provider and (ii) the second priority indicator corresponding to the second user account.

In another aspect, a network device is provided. The network device includes a processor and memory having stored thereon instructions executable by the processor to cause the network device to perform functions. The functions include receiving from a playback device, data indicating (i) a service provider, (ii) a first user account for the service provider, and (iii) a second user account for the service provider, based on the received data, identifying the first user account as a default user account corresponding to the network device, and causing a graphical display to display a graphical representation that indicates the first user account is an active user account.

In a further aspect, a non-transitory computer readable medium is provided. The non-transitory computer readable medium has stored thereon instructions executable by a computing device to cause the computing device to perform functions. The functions include maintaining data indicating (i) a first user account for a service provider and (ii) a first priority indicator corresponding to the first user account, receiving data indicating a second user account for the service provider, based on the received data indicating the second user account for the service provider, determining a second priority indicator corresponding to the second user account, and causing to be stored, data indicating (i) the second user account for the service provider and (ii) the second priority indicator corresponding to the second user account.

While some examples described herein may refer to functions performed by given actors such as "users" and/or other entities, it should be understood that this is for purposes of explanation only. The claims should not be interpreted to require action by any such example actor unless explicitly required by the language of the claims themselves. It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
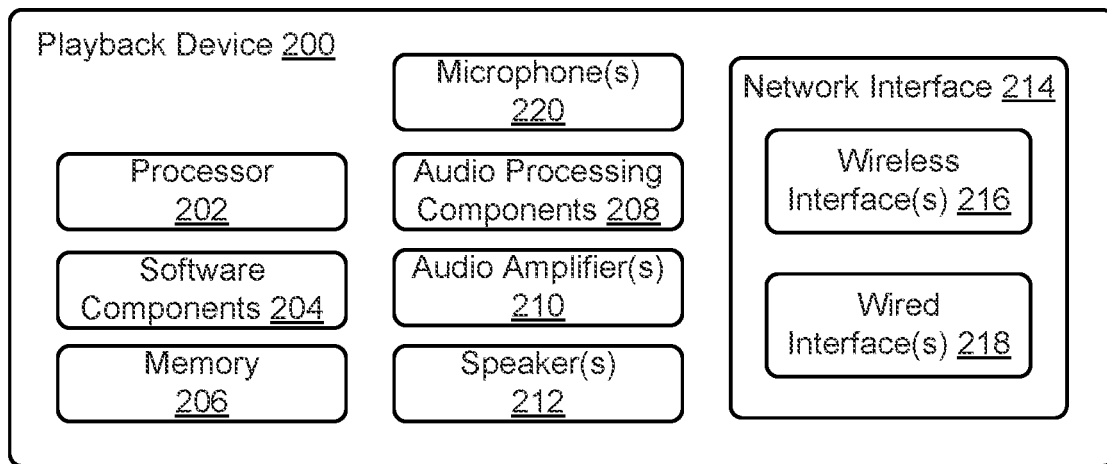
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, microphone(s) 220, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more of digital-to-analog converters (DAC), analog-to-digital converters (ADC), audio preprocessing components, audio enhancement components, and a digital signal processor (DSP), among others. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The microphone(s) 220 may include an audio sensor configured to convert detected sounds into electrical signals. The electrical signal may be processed by the audio processing components 208 and/or the processor 202. The microphone(s) 220 may be positioned in one or more orientations at one or more locations on the playback device 200. The microphone(s) 220 may be configured to detect sound within one or more frequency ranges. In one case, one or more of the microphone(s) 220 may be configured to detect sound within a frequency range of audio that the playback device 200 is capable or rendering. In another case, one or more of the microphone(s) 220 may be configured to detect sound within a frequency range audible to humans. Other examples are also possible.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
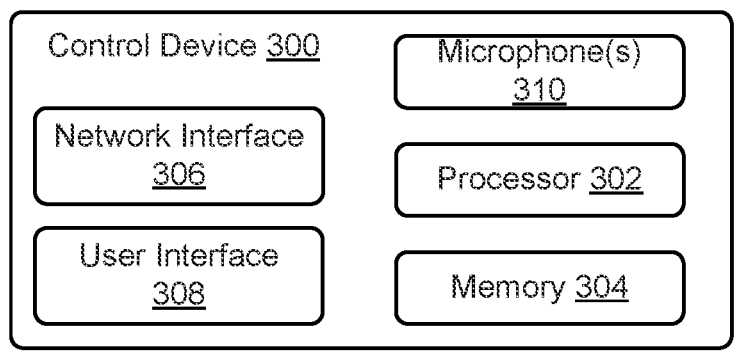
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, a user interface 308, and microphone(s) 310. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

The microphone(s) 310 may include an audio sensor configured to convert detected sounds into electrical signals. The electrical signal may be processed by the processor 302. In one case, if the control device 300 is a device that may also be used as a means for voice communication or voice recording, one or more of the microphone(s) 310 may be a microphone for facilitating those functions. For instance, the one or more of the microphone(s) 310 may be configured to detect sound within a frequency range that a human is capable of producing and/or a frequency range audible to humans. Other examples are also possible.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
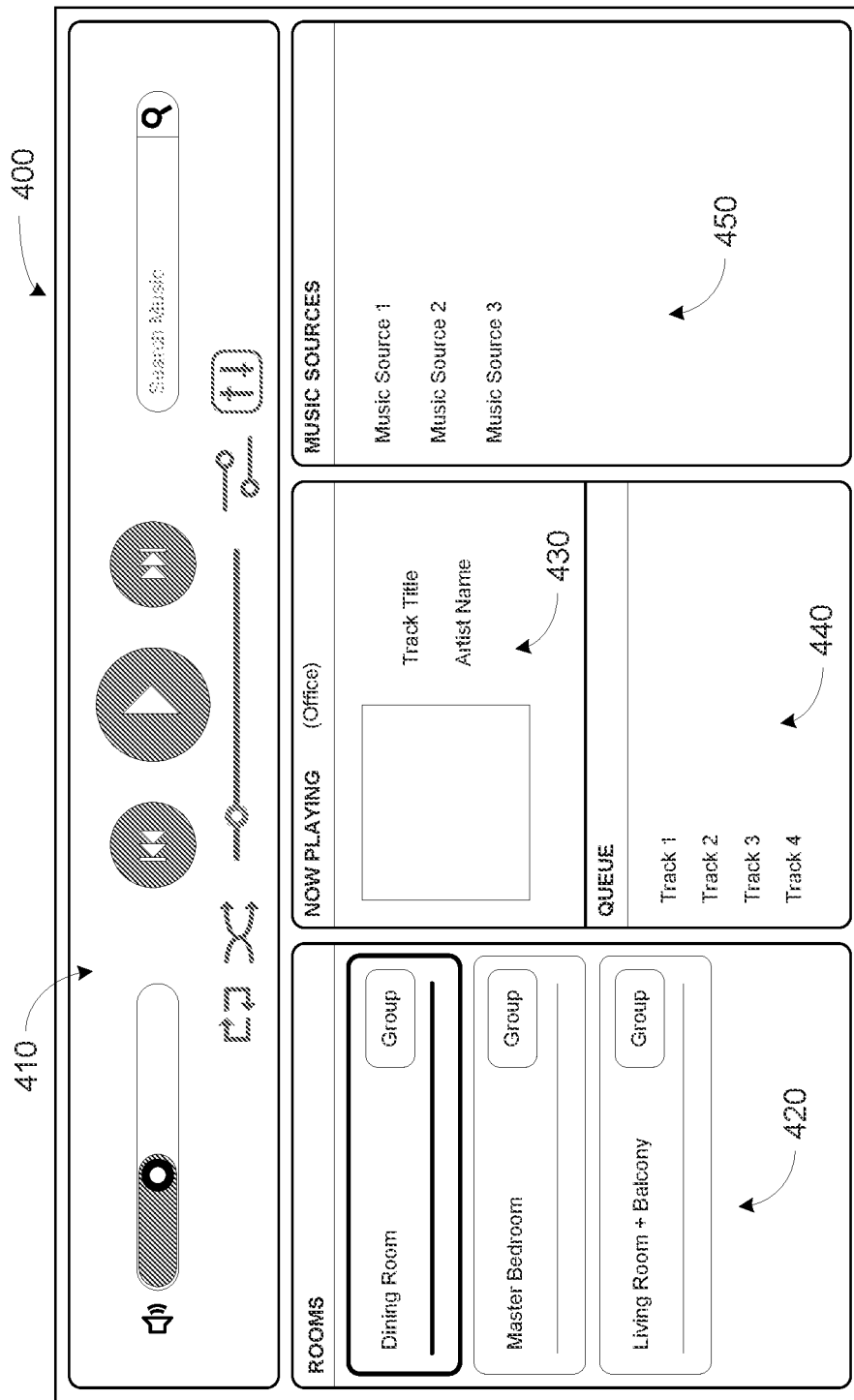
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Method for Managing Two or More User Accounts

Figure 5:
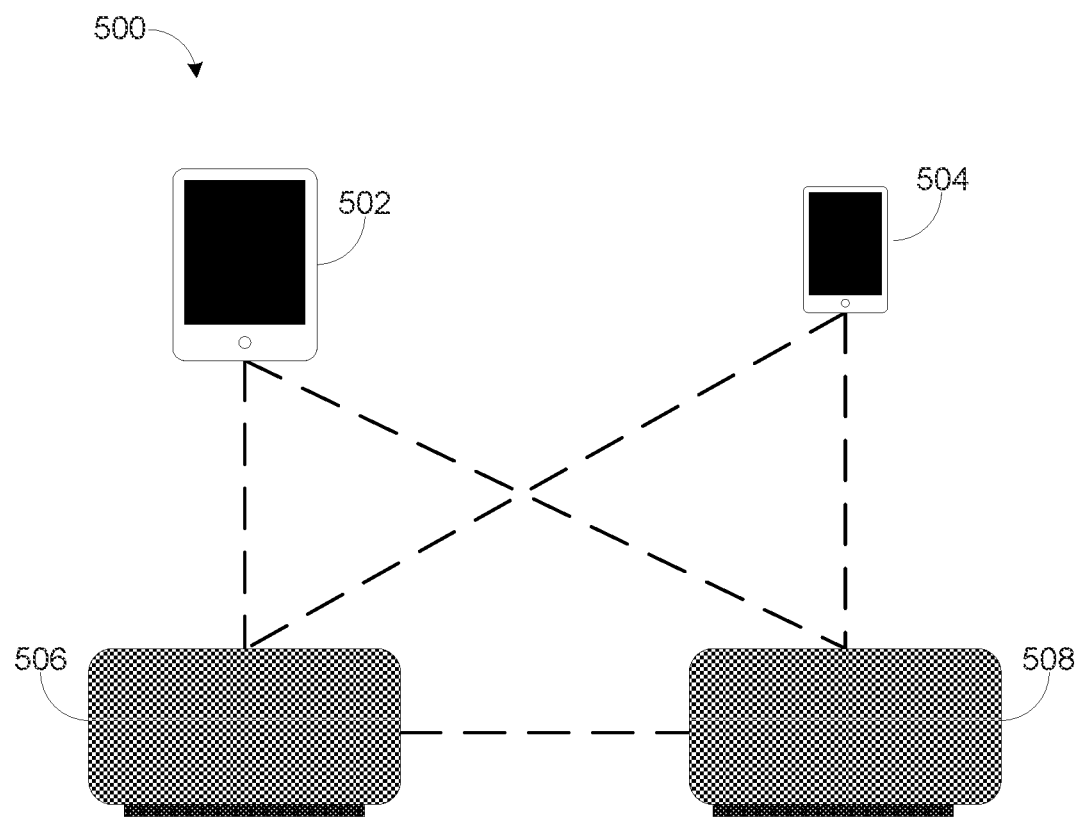
FIG. 5 shows an example media playback system environment.

As indicated above, discussions herein involve managing two or more user accounts via which a media playback system can access a service provider. FIG. 5 shows an example media playback system environment 500 within which the methods 600 and 700, as will be discussed below in connection to FIGS. 6 and 7, respectively, may be performed.

The media playback system environment 500 includes a first network device 502, a second network device 504, a first playback device 506, and a second playback device 508. One or both of the first network device 502 and the second network device 504 may be a control device, such as the control device 300 of FIG. 3. The first playback device 506 and the second playback device 508 may be playback devices in a media playback system, and may both be similar to the playback device 200 of FIG. 2. As described, the first playback device 506 and the second playback device 508 may play media content individually or play media content in synchrony, as part of a playback zone, or as part of a zone group.

As shown, the first network device 502 may be in communication, or is at least capable of being in communication with the first playback device 506 and/or the second playback device 508. Likewise, the second network device 502 may be in communication, or is at least capable of being in communication with the first playback device 506 and/or the second playback device 508. Being in the same media playback system, the first playback device 506 and the second playback device 508 may also be in communication or are at least capable of being in communication. Though not shown, the first network device 502 and the second network device 504 may also be capable of being in communication.

In one example, the first network device 502 may be a network device used by a first user to access and control the media playback system, while the second network device 504 may be a network device used by a second user to access and control the media playback system.

Figure 6:
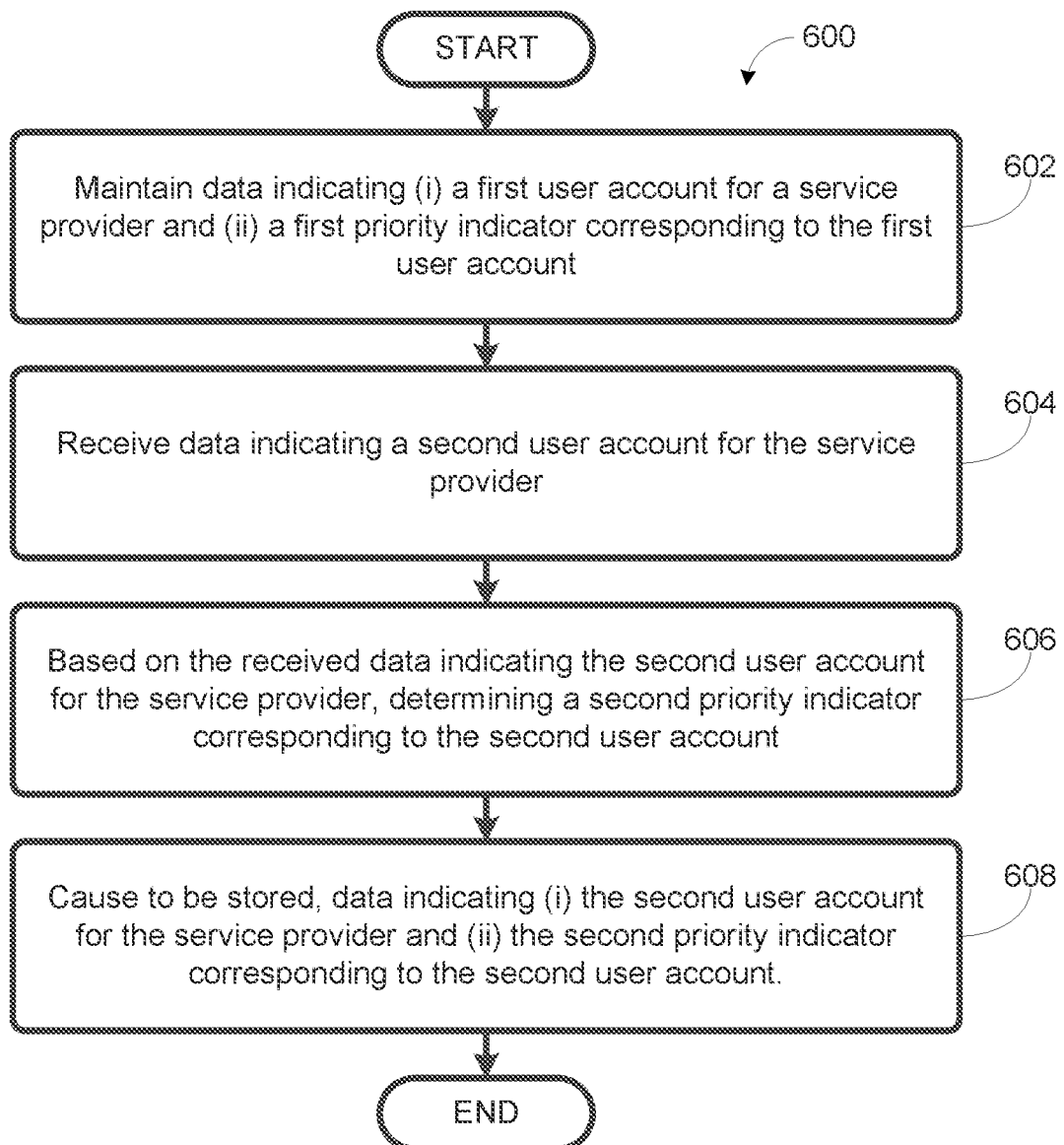
FIG. 6 shows an example flow diagram of a method for managing two or more user accounts via which a media playback system can access a service provider.

FIG. 6 shows an example flow diagram of a method 600 for managing two or more user accounts via which a media playback system can access a service provider. Method 600 shown in FIG. 6 presents an embodiment of a method that can be implemented within an operating environment involving, for example, the media playback system 100 of FIG. 1, one or more of the playback device 200 of FIG. 2, and media playback system environment 500 of FIG. 5. In one example, the method 600 may be performed by a playback device, such as the playback device 200 of FIG. 2, or one or more of the playback devices 506 and 508 of FIG. 5. In particular, the method 600 may be performed by a processor of the playback device, such as the processor 202 of the playback device 200, a processor of the playback device 506, or a processor of the playback device 508. In another example, the method 600 may alternatively be performed in whole or in part by a computing device, such as a server in communication with the playback device.

Method 600 may include one or more operations, functions, or actions as illustrated by one or more of blocks 602-608. Although the blocks are illustrated in sequential order, these blocks may also be performed in parallel, and/or in a different order than those described herein. Also, the various blocks may be combined into fewer blocks, divided into additional blocks, and/or removed based upon the desired implementation. In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block may represent circuitry that is wired to perform the specific logical functions in the process.

As shown in FIG. 6, the method 600 involves maintaining data indicating (i) a first user account for a service provider and (ii) a first priority indicator corresponding to the first user account at block 602, receiving data indicating a second user account for the service provider at block 604, based on the received data indicating the second user account for the service provider, determining a second priority indicator corresponding to the second user account at block 606, and causing to be stored, data indicating (i) the second user account for the service provider and (ii) the second priority indicator corresponding to the second user account at block 608.

At block 602, the method 600 involves maintaining data indicating (i) a first user account for a service provider and (ii) a first priority indicator corresponding to the first user account. As indicated above, method 600 may be performed by a device in a media playback system. For illustration purposes, discussions of the method 600 herein may generally refer to the method 600 as being coordinated and/or performed at least in part by the first playback device 506 of FIG. 5. Nevertheless, it is understood that the method 600 may also be coordinated and/or performed at least in part by the second playback device 508.

In one example, the first playback device 506 may receive data indicating the first user account for the service provider when the first user account is registered with the media playback system that the first playback device 506 is a part of. Registration of the first user account may allow the media playback system to access, and play media content from the service provider using credentials of the first user account.

In one case, the playback device 506 may have received the data indicating the first user account from a network device, such as one of the network devices 502 and 504. In such a case, the first user account may have been registered with the media playback system via the first playback device 506. As such, the first playback device 506 may determine the first priority indicator corresponding to the first user account.

In one instance, the first priority indicator may be a time stamp indicating when the first user account for the service provider was registered with the media playback system. In another instance, the first priority indicator may be an incremental numeric value based on a number of user accounts previously registered with a media playback system. Additional description of priority indicators and determination of priority indicators can be found below in connection to block 606.

In another example, the first playback device 506 may receive the data indicating the first user account as well as the first priority indicator corresponding to the first user account from another device in the media playback system, such as the playback device 508. In such a case, the first user account may have been registered with the media playback system via another device in the media playback system, and the device via which the first user account was registered may have determined the first priority indicator. The first playback device 506 may have received the data from the device via which the first user account was registered either directly or via another device in the media playback system.

The first playback device 506 may then store, either locally in memory on the first playback device 506, or cause for storage in memory on a different device associated with the first playback device 506, the data indicating the first user account and the first priority indicator. Maintaining data indicating the first user account and the first priority indicator may further involve receiving data indicating any modifications to the first user account, the first priority indicator, and/or any other information associated with the first user account. Based on the data indicating the modifications, the first playback device 506 may update the data indicating the first user account and the first priority indicator, and store or cause to be stored the updated data. Other examples are also possible.

At block 604, the method 600 involves receiving data indicating a second user account for the service provider. In one example, the playback device 506 may receive the data indicating the second user account when the second user account is being registered with the media playback system via the playback device 506. For instance, the data indicating the second user account may further indicate that the second user account is registered with the media playback system that includes the first playback device 506 (and the second playback device 508).

As with the case described above in connection to the first user account at block 602, registration of the second user account may allow the media playback system to access, and play media content from the service provider using credentials of the second user account.

In other words, a network device, such as the network device 502 or 504 may be used to register the second user account with the media playback system, and the network device may establish communication with the media playback system via the playback device 506. The playback device 506 may accordingly receive from the network device, the data indicating the second user account for the service provider.

At block 606, the method 600 involves based on the received data indicating the second user account for the service provider, determining a second priority indicator corresponding to the second user account. As indicated above in connection to block 602 and the first priority indicator, a priority indicator for a user account may be a time stamp indicating when the user account for the service provider was registered with the media playback system, an incremental numeric value based on a number of user accounts previously registered with a media playback system, or some combination of the time stamp and incremental numeric value, among other possibilities.

As such, in one case, the playback device 506 may determine the second priority indicator by determining a time stamp corresponding to a time when the data indicating the second user account was received. In one instance, the time stamp may be a clock time of a processor of the playback device 506, when the playback device 506 first received the data indicating the second user account. In another instance, the received data indicating the second user account may further indicate a time stamp. In this instance, the time stamp may be a clock time of a processor of the network device that sent the data indicating the second user account when sending the data indicating the second user account. Other examples are also possible.

In another case, the playback device 506 may determine the second priority indicator by determining an order in which the second user account was registered with the media playback system. In one example, the numeric value may be determined based on a number of total user accounts registered with the media playback system. For instance, if four user accounts were registered with the media playback system prior to the second user account, the second priority indicator corresponding to the second user account may be determined as a numeric value of 5.

In another example, the numeric value may be determined based on a number of user accounts for a particular service provider, registered with the media playback system. For instance, if four user accounts were registered with the media playback system prior to the second user account for the service provider, but only one of the four user accounts are for the same service provider as the second user account, the second priority indicator corresponding to the second user account may be determined as "SP3-2" where SP3 may indicate the service provider. Other examples are also possible.

At block 608, the method 600 involves causing to be stored, data indicating (i) the second user account for the service provider and (ii) the second priority indicator corresponding to the second user account. In one example, the playback device 506 may store the data locally in memory on the first playback device 506. In another example, the playback device 506 may cause for storage, the data in memory on a different device associated with the first playback device 506.

In one case, the data indicating the second user account and the second priority indicator may be stored in a database that includes data indicating the first user account and the first priority indicator. The database may further include data indicating other user accounts and priority indicators corresponding to the other accounts.

In one example, the first playback device 506 may further transmit the data indicating the second user account and the second priority indicator to one or more other devices in the media playback system. For instance, the first playback device 506 may transmit the data indicating the second user account and the second priority indicator to the second playback device 508.

In one case, the second playback device 508 may accordingly store the data indicating the second user account and the second priority indicator, similar to that described in connection to the first playback device 506 maintaining the data indicating the first user account and the first priority indicator at block 602. In another case, if the second playback device 508 has stored on memory, data indicating a previous version of a database of user accounts and priority indicators that does not include the second user account and second priority indicator, the second playback device 508 may update the database according to the received data indicating the second user account and second priority indicator.

In another example, if the data indicating the second user account and the second priority indicator is stored in that database that also includes data indicating the first user account and the first priority indicator, the first playback device 506 may transmit data indicating the database to the second playback device 508. In one case, if the second playback device 508 has stored on memory, a previous version of a database of user accounts and priority indicators, the second playback device 508 may compare the received database and the previous version of the database, and update the previous version of the database based on the comparison. In this case, if the previous version of the database did not include the second user account and second priority indicator, the second playback device 508 may update the previous version of the database by adding the second user account and the second priority indicator.

In another case, the second playback device 508, upon receiving the data indicating the database, may delete or archive the previous version of the database, and store the newly received database. Other examples are also possible.

In addition to the functions described above in connection to method 600 of FIG. 6, additional functions may also be performed by the first playback device 506, or another device performing and/or coordinating method 600, in addition to, or along with method 600. Some examples of the additional functions are described below in reference to method 600. Nevertheless, one having ordinary skill in the art will understand that the additional functions are not necessary to perform method 600.

In one example, the data indicating the second user account for the service provider that is received by the first playback device 506 at block 604 may further indicate a user account name. The user account name may indicate a user name associated with the second user account for the service provider. Accordingly, the first playback device 506 may further cause to be stored, data indicating an association between the user name and the second user account. In one case, the user name may be an alias or screen name corresponding to the second user account. In another case, the user name may be an email address corresponding to the second user account.

In another example, the data indicating the second user account for the service provider that is received by the first playback device 506 at block 604 may further indicate a network device from which the data was received. For instance, if the data indicating the second user account was received from the first network device 502, the data may further indicate that the data was received from the first network device 502. In one case, the data may indicate specifically that the second user account was registered, or is being registered with the media playback system using the first network device 502. In another case, the data may identify a source of the data, therefore indicating the first network device 502. Accordingly, the first playback device 506 may further cause to be stored, data indicating an association between a device identifier of the first network device 502 and the second user account.

In one example, the first playback device 506 may receive from a network device, such as the network device 502 or 504, an instruction to play media content from the service provider. As indicated above, the service provider may be accessed by the media playback system using at least the first user account or the second user account.

In one case, the first playback device 506 may identify one of at least the first user account and the second user account based on at least the first priority indicator and the second priority indicator. For instance, the first playback device 506 may identify one of at least the first user account and the second user account, based on which user account was registered with the media playback system earlier. As such, if the first priority indicator has a lower numeric value, or a time stamp indicating an earlier time than that of the second priority indicator, the first playback device 506 may identify the first user account.

In another case, if the data indicating the first user account (as maintained at block 602) further indicates the network device via which the first user account was registered, the first user account may be identified if the instruction to play media content from the service provider was received from the same network device via which the first user account was registered.

Based on the identification of the first user account, the first playback device 506 and/or other devices in the media playback system, may use the first user account to obtain from the service provider, the media content to be played, and play the media content. For instance, the first playback device 506 may access the service provider using access credentials associated with the first user account. As indicated previously, the media content may include media items identified based on media preferences, curated playlists, and/or custom playlists associated with the user account.

In another example, the instruction to play media content from the service provider that is received from the network device may further identify a user account (that is registered with the media playback system) via which the media content should be obtained. In such a case, the first playback device 506 may accordingly use the identified user account to obtain from the service provider, the media content to be played, and play the media content. Other examples are also possible.

In one example, user accounts that are registered with the media playback system may be active or inactive user accounts. In one case, the data maintained at block 602 may further indicate whether the first user account is an active user account. Similarly, the data stored at block 608 may further indicate whether the second user is an active user account. In one case, user accounts that are registered with the media playback system may be active by default, and only when a user account is inactive is there any indication that the user account is inactive. Other examples are also possible.

In a case where the first user account is an active user account, the first playback device 506, or another device in the media playback system, such as the second playback device 508, may receive an input indicating that the first user account is to be deactivated. In one example, a user of the media playback system may wish to deactivate the first user account if the first user account belongs to a user that will not be using the media playback system for some time. For instance, the first user account may belong to a child who has just left for college, or a roommate who has gone on vacation.

In response to the input to deactivate the first user account, the first playback device 506 may cause to be stored, data indicating that the first user account is an inactive account. In one case, the data indicating the first user account and the first priority indicator, as maintained at block 602, may be updated to indicate that the first user account is now inactive. In one instance, only the active or inactive status of the first user account is modified, while the first priority indicator corresponding to the first user account remains unchanged.

In another case, the first playback device 506 may maintain a first database of active user accounts that includes data indicating user accounts and corresponding priority indicators for active user accounts that are registered with the media playback system. The first playback device 506 may further maintain a second database of inactive user accounts that includes data indicating user accounts and corresponding priority indicators for inactive users that are registered with the media playback system. In such a case, the first playback device 506, upon receiving the input to deactivate the first user account, may modify the second database to include the first user account and the first priority indicator, and remove from the first database, the first user account and the first priority indicator.

In a further case, the first playback device 506 may maintain the first database of active user accounts registered with the media playback system as described above, and instead of the second database of inactive user accounts, the first playback device 506 may maintain a database of all user accounts registered with the media playback system, whether the user accounts are active or inactive. In this case, the first playback device 506, upon receiving the input to deactivate the first user account, may remove from the first database, the first user account and the first priority indicator, without modifying the third database. Other examples are also possible.

Subsequently, the first playback device 506 or another device in the media playback system, such as the second playback device 508, may receive an input indicating that the first user account is to be activated. In one case, first playback device 506 may responsively, identify the first priority indicator corresponding to the first user account. For instance, the first playback device 506 may access the data indicating the first user account and identify the first priority indicator corresponding to the first user account.

The first playback device 506 may then cause to be stored, data indicating (i) the first user account for a service provider, (ii) the first priority indicator corresponding to the first user account, and (iii) that the first user account is an active account. For instance, the data indicating the first user account and the first priority indicator may be updated to indicate that the first user account is now active.

In the case the first playback device 506 maintains a first database of active user accounts registered to the media playback system and a second database of inactive user accounts registered to the media playback system, the first playback device 506, responsive to the input to activate the first user account, may modify the first database to once again include the first user account and the first priority indicator, and remove from the second database, the first user account and the first priority indicator.

In the case the first playback device 506 maintains the first database of active user accounts registered to the media playback system and the third database of all user accounts registered to the media playback system, the first playback device 506, responsive to the input to activate the first user account, may modify the first database to once again include the first user account and the first priority indicator, without modifying the third database. In one case, the first playback device 506 may identify the first user account and the first priority indicator in the third database to be stored again in the first database. Other examples are also possible.

In one example, a network device in communication with the media playback system, such as the network device 502 or 504 may transmit to a device in the media playback system, such as the first playback device 506, a request for data indicating service providers associated with the media playback system. In one instance, the network device may transmit the request when a software application that provides a controller interface for controlling the media playback system is launched on the network device, and the network device is retrieving information associated with the media playback system to display on the controller interface. For instance, the network device may be configured to provide on the controller interface, graphical representations of the service providers from which the media playback system may play media content.

In one example, the request for data indicating service providers associated with the media playback system may further include a request for data indicating one or more user accounts via which the media playback system can access the service providers.

In one case, the first playback device 506 may determine that the network device is configured to provide access to service providers, via the controller interface, using a single account per service provider. In other words, referencing the examples above, the first playback device 506 may determine that the network device is configured to provide access to the service provider using either the first user account or the second user account, but not both.

In one case, the configuration to provide access to the service provider using only a single account may involve a software version of the software application providing the controller interface. In another case, the configuration to provide access to the service provider using only a single account may involve access restrictions implemented by the service provider. In this case, the network device may be configured to provide access to some service providers using multiple accounts, and some other service providers using only a single account per service provider. Other examples are also possible.

In the case the network device is configured to provide access to the service provider using either the first user account or the second user account, the first playback device 506 may determine based on at least the first priority indicator corresponding to the first user account, and the second priority indicator corresponding to the second user account, which user account the network device is to provide for accessing the service provider. The identified user account may be referred to herein as a default user account corresponding to the network device.

Similar to that discussed above, the first playback device 506 may identify one of at least the first user account and the second user account, based on which user account was registered with the media playback system earlier. As such, if the first priority indicator has a lower numeric value, or a time stamp indicating an earlier time than that of the second priority indicator, the first playback device 506 may identify the first user account as the default user account.

As also discussed above, if the data indicating the first user account (as maintained at block 602) further indicates the network device via which the first user account was registered, the first user account may be identified if the request for data indicating the service providers associated with the media playback system was received from the same network device via which the first user account was registered.

Upon identifying the first user account, the first playback device 506 may transmit to the network device, data indicating (i) the service provider and (ii) the first user account for the service provider, among other information relating to the first user account. In one case, no information relating to the second user account is transmitted to the network device.

In another case, the first playback device 506 may determine that the network device is configured to provide access to service providers, via the controller interface, using one or more user accounts per service provider. In other words, referencing the examples above, the first playback device 506 may determine that the network device is configured to provide access to the service provider using both the first user account and the second user account.

Responsively, the first playback device 506 may transmit to the network device, data indicating (i) the service provider, (ii) the first user account for the service provider, among other information relating to the first user account, and (iii) the second user account for the service provider, among other information relating to the first user account. In one case, data indicating the first priority indicator corresponding to the first user account and data indicating the second priority indicator corresponding to the second user account may also be transmitted to the network device. Other examples are also possible.

Further in this example, the first playback device 506 may also determine a default user account via which the network device may provide access to the service provider. While both the first user account and the second user account may be active users and may be used to access the service provider, the default user account may be used to access the service provider by default. Additional inputs may be required to access the service provider using a user account other than the default user account.

The first playback device 506 may determine based on at least the first priority indicator corresponding to the first user account, and the second priority indicator corresponding to the second user account, which user account is the default user account via which the network device may provide access to the service provider.

Similar to that discussed above, the first playback device 506 may identify one of at least the first user account and the second user account, based on which user account was registered with the media playback system earlier. As such, if the first priority indicator has a lower numeric value, or a time stamp indicating an earlier time than that of the second priority indicator, the first playback device 506 may identify the first user account as the default account for the network device.

As also discussed above, if the data indicating the first user account (as maintained at block 602) further indicates the network device via which the first user account was registered, the first user account may be identified as the default account if the request for data indicating the service providers associated with the media playback system was received from the same network device via which the first user account was registered. Other examples are also possible.

Further discussions relating to a network device, such as the first network device 502 or the second network device 504, providing access to one or more service providers via one or more user accounts are provided in the following section.

While the methods described above are generally discussed as being performed by a playback device, and more specifically, the playback device 506, one having ordinary skill in the art will appreciate one or more functions described above may alternatively performed by one or more other devices in communication with the playback device 506. For instance, the media playback system may further include a particular priority indicator device that is configured to determine priority indicators. In such a case, block 606 may involve the playback device 506 transmitting a request for priority indicators to the priority indicator device, and subsequently receive from the priority indicator device, the second priority indicator. In one example, the priority indicator device may determine the second priority indicator according to that described in connection to block 606. Other examples are also possible.

IV. Example Method for Displaying at Least One of Two or More User Accounts

Figure 7:
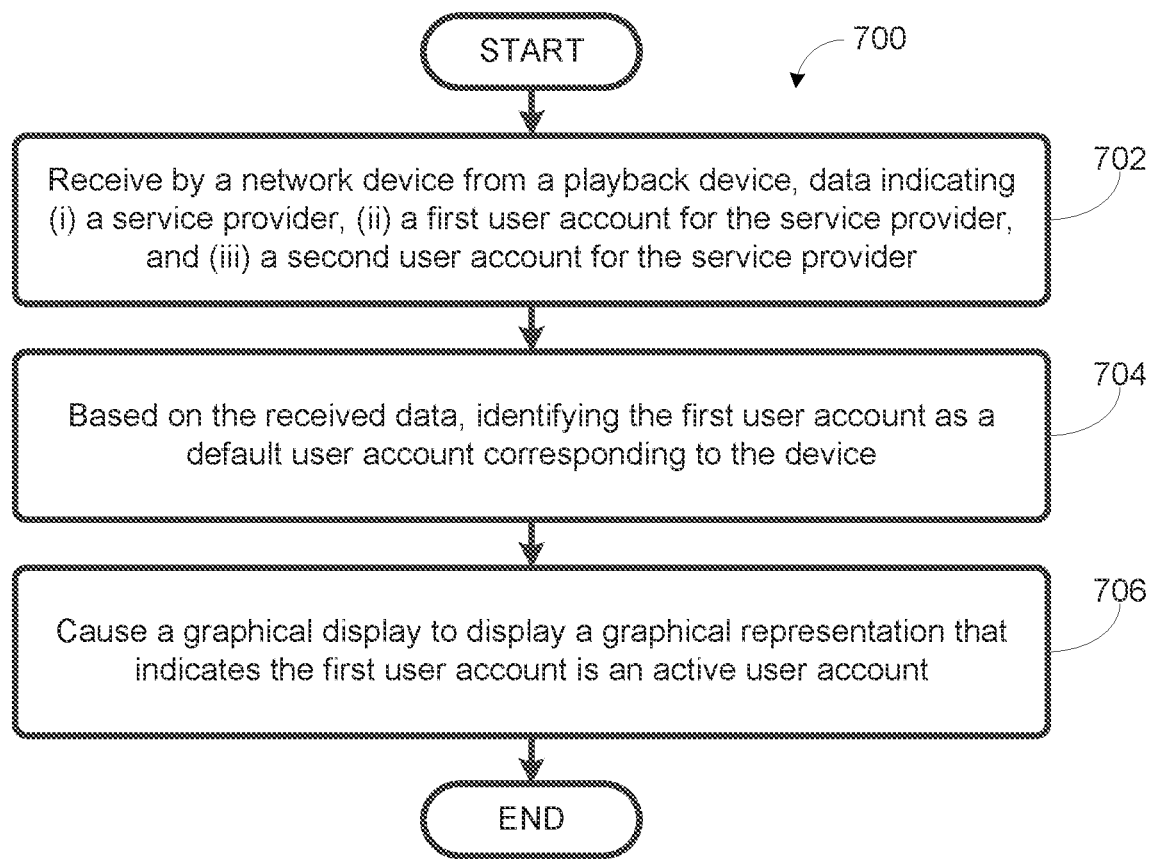
FIG. 7 shows an example flow diagram of a method for displaying graphical representations indicating at least one of two or more user accounts via which a media playback system can access a service provider.

As indicated above, discussions herein involve displaying on a graphical display, graphical representations of at least one of the two or more user accounts via which a media playback system can access a service provider. FIG. 7 shows an example flow diagram of a method 700 for displaying graphical representations indicating at least one of two or more user accounts via which a media playback system can access a service provider.

Method 700 shown in FIG. 7 presents an embodiment of a method that can be implemented within an operating environment involving, for example, the media playback system 100 of FIG. 1, one or more of the playback device 200 of FIG. 2, one or more of the control device 300 of FIG. 3, and the media playback system environment 500 of FIG. 5, respectively. In one example, the method 700 may be performed by a device such as the control device 300 of FIG. 3, the network device 502 of FIG. 5, or the network device 504 of FIG. 5. In particular, the method 700 may be performed by a processor of the device, such as the processor 302 of the control device 300, a processor of the network device 502, or a processor of the network device 504. In another example, the method 700 may alternatively be performed in whole or in part by a computing device, such as a server in communication with the playback device.

Method 700 may include one or more operations, functions, or actions as illustrated by one or more of blocks 702-706. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

As shown in FIG. 7, the method 700 involves receiving from a playback device, data indicating (i) a service provider, (ii) a first user account for the service provider, and (iii) a second user account for the service provider at block 702, based on the received data, identifying the first user account as a default user account corresponding to the device at block 704, and causing a graphical display to display a graphical representation that indicates the first user account is an active user account at block 706.

For illustration purposes, discussions of the method 700 herein may generally refer to the method 700 as being be coordinated and/or performed at least in part by the first network device 502 of FIG. 5. Nevertheless, it is understood that the method 600 may also be coordinated and/or performed at least in part by the second network device 504.

At block 702, the method 700 involves receiving from a playback device, data indicating (i) a service provider, (ii) a first user account for the service provider, and (iii) a second user account for the service provider. Continuing with the examples above, the playback device may be one or more of the first playback device 506, the second playback device 508, or any other device in the media playback system described above in connection to FIG. 5.

In one example, the data indicating the service provider, the first user account, and the second user account may be received from the first playback device 506 when the first network device 502 established communication with the media playback system. For instance, as described previously, the first network device 502 and the media playback system may establish communication when a software application that provides a controller interface for controlling the media playback system is launched.

In one example, the software application may be launched when a user causes the first network device 502 to launch the software application because the user wishes to access the media playback system. In another example, the software application may be launched when the first network device 502 moves within communicative range of the media playback system. Other examples are also possible.

Upon launching of the software application, the first network device 502 may begin retrieving information associated with the media playback system to display on the controller interface. In such a case, the first network device 502 may transmit to the first playback device 506, a request for data indicating service providers that the media playback device may access and play media content from, and user accounts via which the media playback device may access the service providers. In one instance, the data indicating the service provider, the first user account, and the second user account may be received subsequent to the transmission of the request. As indicated previously, the first playback device 506 may transmit the data indicating the service provider, the first user account and the second user account in response to the request from the first network device 502.

In some cases, the data may further include additional information relating to the service providers and the user accounts. For instance, the data may further indicate one or more of the first priority indicator associated with the first user account, the second priority indicator associated with the second user account, an association between the first user account and the first network device 502, an association between the second user account and the first network device 502, a user name associated with the first user account, and a user name associated with the second user account, among other possibilities. In one instance, the data may indicate which of the first user account and the second user account is a default user account via which the first network device 502 is to access the service provider. Other examples are also possible.

At block 704, the method 700 involves based on the received data, identifying the first user account as a default user account corresponding to the device. In one example, if the received data indicates the first priority indicator corresponding to the first user account and the second priority indicator corresponding to the second user account, identifying the first user account as the default user account corresponding to the first network device 502 may involve determining that the first user account has a higher priority than the second user account, and responsively, identifying the first user account as the default user account.

In one case, the network device may identify that the first user account has a higher priority than the second user account based on the first priority indicator indicating a time stamp earlier than a time stamp indicated by the second priority indicator. In another example, the network device may identify the first user account as the default user account for the service provider based on the first priority indicator indicating a numeric value smaller than a numeric value indicated by the second priority indicator. In other words, in these examples, an earliest registered user account for the service provider may be identified as having a higher priority, and may therefore be identified as the default user account.

In another example, if the received data indicates an association between the first user account and the first network device 502, identifying the first user account as the default account may be based on the association between the first user account and the first network device 502. For instance, if the association between the first user account and the first network device 502 indicates that the first network device 502 is the device via which the first user account was registered to the media playback system, the first user account may be identified as the default user account corresponding to the first network device 502.

In a further example, if the received data indicates which of the first user account and the second user account is a default user account via which the first network device 502 is to access the service provider, the first network device 502 may identify the default user account accordingly. For instance, if the received data indicates that the first user account is to be the default user account, then the first network device 502 may accordingly identify the first user account as the default user account based on the received data. Other examples are also possible.

Based on the determination that the first user account is the default user account corresponding to the first network device 502, the default user account may be used to access the service provider by default when the media playback system accesses the service provider in response to an input from the first network device 502. As indicated previously, additional inputs may be required to access the service provider using a user account other than the default user account.

Figure 8:
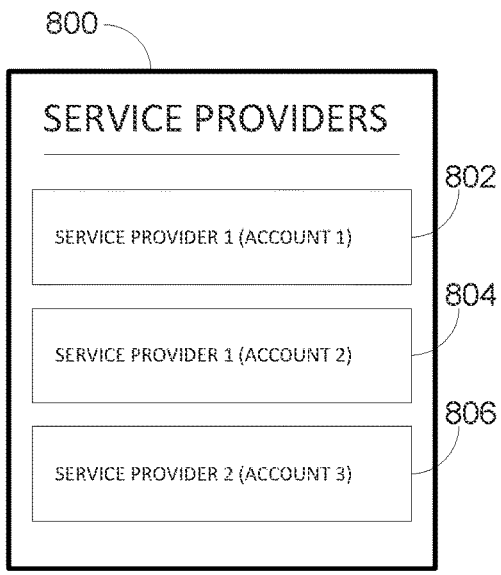
FIG. 8 shows an example graphical interface displaying user accounts via which a media playback system can access a service provider.

At block 706, the method 700 involves causing a graphical display to display a graphical representation that indicates the first user account is an active user account. The graphical display may be a graphical display of the network device 502, and the graphical representation may be a part of the controller interface for controlling the media playback system. FIG. 8 shows an example graphical interface 800 displaying user accounts via which a media playback system can access a service provider. In one example, the graphical interface 800 may be a version of the audio content sources region 450 shown in FIG. 4.

As shown, graphical representation 802 indicates that media content from service provider "Service Provider 1" is available via user account "Account 1," graphical representation 804 indicates that media content from Service Provider 1 is also available via user account "Account 2," and graphical representation 806 indicates that media content from service provider "Service Provider 2" is available via user account "Account 3." For illustration purposes, Account 1 may be a user name of the first user account described previously, Account 2 may be a user name of the second user account described previously, and Service Provider 1 may be the service provider accessible via the first user account and the second user account.

In this example, the graphical representations 802 and 804 indicate that the Service Provider 1 may be accessible via both Account 1 and Account 2. In other words, both Account 1 and Account 2 may be active user accounts via which the media playback system may access Service Provider 1. In this case, the graphical representation 802 may be displayed above the graphical representation 804 because Account 1 was identified as a default account for accessing Service Provider 1. In other words, unless otherwise instructed, the media playback system may access Service Provider 1 via Account 1, rather than Account 2.

In one example, each of the graphical representations 802-806 may be selectable to further browse and select media content from the respective service provider. A selection of the graphical representation 806, for example, may cause the graphical display to display options for selecting media content from Service Provider 2 via Account 3 to be played by the media playback system. From the graphical display, one or more inputs may then be received to cause the media playback system, including the first playback device 506 and the second playback device 508 to play particular media content from Service Provider 2. Based on the one or more inputs, the first network device 502 may then send to at least one of the first playback device 506 and the second playback device 508, data indicating the particular media content from Service Provider 2 that the playback devices 506 and/or 508 are to retrieve using Account 3 and play. Other examples are also possible.

Figure 9A:
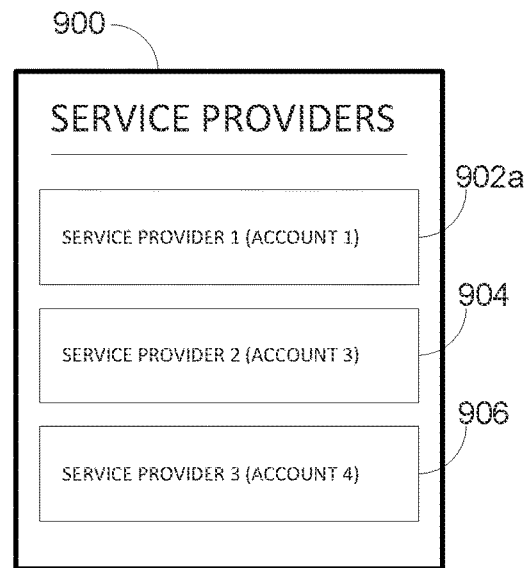
FIGS. 9A, 9B, and 9C shows a series of example graphical interfaces illustrating switching from a first user account via which a media playback system can access a service provider to a second user account via which the media playback system can access the service provider.
Figure 9B:
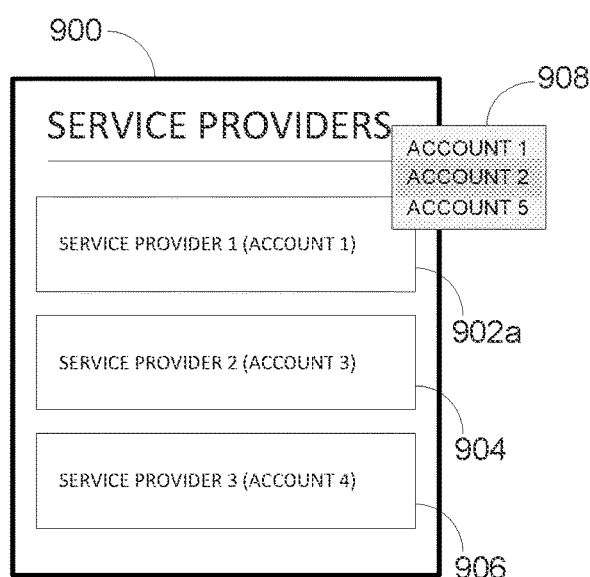
Figure 9C:
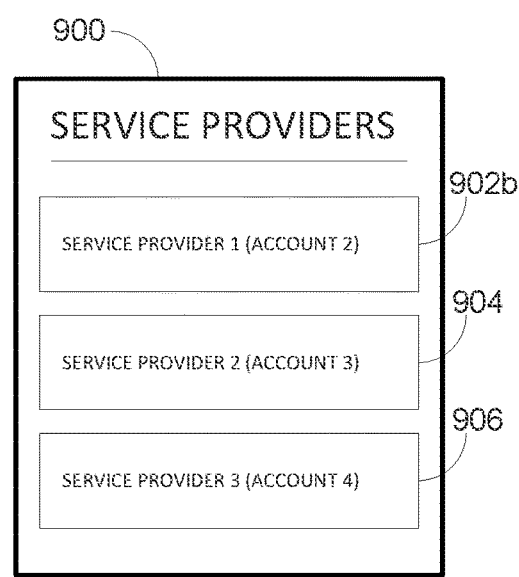

FIGS. 9A-9C show a series of an example graphical interface 900 illustrating switching from a first user account via which a media playback system can access a service provider to a second user account via which the media playback system can access the service provider. As shown in FIG. 9A, graphical representation 902a indicates that the media playback system can access service provider "Service Provider 1" via user account "Account 1," graphical representation 904 indicates that the media playback system can access service provider "Service Provider 2" via user account "Account 3," and graphical representation 906 indicates that the media playback system can access service provider "Service Provider 3" via user account "Account 4."

As shown, graphical representations corresponding to only one user account per service provider is displayed. In this case, Account 1 may be the default user account for accessing Service Provider 1 when controlling the media playback system via the network device 502, Account 3 may be the default user account for accessing Service Provider 2 when controlling the media playback system via the network device 502, and Account 4 may be the default user account for accessing Service Provider 3 when controlling the media playback system via the network device 502.

In one example, each of the graphical representations 902a-906 may be selectable to further browse and select media content from the respective service provider. As such, a selection of the graphical representation 906, for example, may cause the graphical display to display options for selecting media content from Service Provider 3 via Account 4 to be played by the media playback system. In one case, the selection to prompt the graphical display to display further options for selecting media content from the respective service provider via the respective user account may be a first type of selection. The first type of selection may include a tap, or a left mouse-click, among other examples.

In another example, one or more of the graphical representations 902a-906 may be selectable to change the active user account for accessing the respective service provider. In one case, a second type of selection of the one or more graphical representation 902a-906 may prompt the graphical display to display options for changing the active user account for accessing the respective service provider. The second type of selection may include a double tap, or a right mouse-click among other examples.

FIG. 9B shows the example graphical interface in response to a second type of selection on the graphical representation 902. As shown, a prompt 908 is provided, listing example user accounts Account 2 and Account 5, in addition to Account 1. Each of Account 1, Account 2, and Account 5 may be active user accounts via which the media playback system can access Service Provider 1. A subsequently selection of Account 2 may be made within the prompt 908. The selection of Account 2 may indicate an input to change the active user via which the media playback device accesses Service Provider 1 from Account 1 to Account 2.

FIG. 9C shows the example graphical interface after a selection of Account 2 in the prompt 908 was made in FIG. 9B. Accordingly, as indicated by graphical representation 902b, Account 2 may now be the active user account via which the media playback system may access Service Provider 1. A selection of the first type on the graphical representation 902b may accordingly cause the graphical display to display options for selecting media content from Service Provider 1 via Account 2 to be played by the media playback system.

In another case, rather than displaying the prompt 908 as shown in FIG. 9B, a selection of the second type on the graphical representation 902a may toggle to the graphical representation 902b. A subsequent selection of the second type on the graphical representation 902b may toggle to a graphical representation (not shown) indicating that the active user account via which the media playback system may access Service Provider 1 is Account 5. A further selection of the second type on that graphical representation may then toggle back to graphical representation 902a, indicating once again that Account 1 is the active account via which the media playback system may access Service Provider 1. Other examples are also possible.

In one example, changing the active account via which the media playback system is to access a service provider may apply only to a current controller interface interaction. In other words, when the controller application is launched again on the network device 502 at a future time, the active user account(s) and the default user account for the network device 502 may be determined as described above, and may not depend on whether the active user was changed during the current controller interface interaction.

In another example, changing the active account via which the media playback system is to access a service provider may further indicate a change in the default account corresponding to the network device 502. In one example, upon changing the active account and accessing media content using the changed active user account, the network device 502 may cause the graphical display to display a prompt to indicate whether the default account for the network device 502 should be changed to the changed active user account. In one case, if the network device 502 responsively receives an input indicating that the default account for the network device 502 is to be changed to the changed active user account, the network device 502 may send to the playback device 506, or another device in the media playback system such as the playback device 508, data indicating that the changed active user account is to become the default user account corresponding to the device. The playback device 508 as described above in connection to block 602, may accordingly update data indicating the first user account and/or data indicating the second user account to further indicate that the second user account is now the default user account corresponding to the network device 502. Other examples are also possible.

In some cases, a graphical representation may also be provided, while media content from a service provider is being played by the media playback system, to indicate which user account was used to access the playing media content. In one example, the graphical representation may be provided on a portion of the controller interface on the network device 502 similar to the playback status region 430 of FIG. 4. The graphical representation may indicate that playback history or identified media preferences generated during the current playback of media content may be associated with the user account identified by the graphical representation. Other examples are also possible.

V. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A non-transitory computer-readable medium comprising program instructions that are executable by at least one processor such that a computing device is configured to:
   while a first user account is selected in a control application configured to control a media playback system comprising playback devices that are connected to a local area network, display, via a graphical display, a graphical user interface of the control application, the graphical user interface comprising (1) a first region comprising (i) an indication of a media playback system identifier corresponding to the media playback system and (ii) respective indications of each zone that is playing audio content in the media playback system, and wherein each zone includes at least one playback device and (2) a second region comprising respective indications of a first set of streaming media services that are accessible for streaming audio to the zones of the media playback system while the first user account is selected;
   display, via the graphical user interface of the control application, a user account control selectable to select among multiple user accounts in the control application;
   receive, via the user account control, input data representing a selection of a second user account;
   switch the control application from selection of the first user account to selection of the second user account;
   after the control application is switched from selection of the first user account to selection of the second user account, modify the graphical user interface to display, in the second region in place of the respective indications of the first set of streaming media services, respective indications of a second set of streaming media services that are accessible for streaming audio to the zones of the media playback system while the second user account is selected, wherein the second set is different than the first set;
   receive, via the graphical user interface, input data representing a selection of a playlist of audio tracks from at least one particular streaming media service in the second set of streaming media services; and
   cause, via a network interface, at least one particular zone in the media playback system to play back the selected playlist of audio tracks, wherein, during playback, at least one given playback device in the at least one particular zone streams data streams representing the audio tracks from one or more servers of the at least one particular streaming audio service.

2. The non-transitory computer-readable medium of claim 1, wherein the program instructions that are executable by the at least one processor such that the computing device is configured to display the user account control selectable to select among multiple user accounts in the control application comprise program instructions that are executable by the at least one processor such that the computing device is configured to:

display a drop-down menu comprising controls selectable to select respective user accounts.

3. The non-transitory computer-readable medium of claim 1, wherein the first set of streaming media services includes a first streaming media service, wherein the second set of streaming media services includes the first streaming media service, wherein the first user account is associated with a first service provider user account of the first streaming media service, and wherein the second user account is associated with a second service provider user account of the first streaming media service.

4. The non-transitory computer-readable medium of claim 3, wherein the non-transitory computer-readable medium further comprises program instructions that are executable by the at least one processor such that the computing device is configured to:

while the first user account is selected in the control application, display first custom playlists of media items from the first streaming media service, the playlists associated with the first service provider user account; and while the second user account is selected in the control application, display second custom playlists of media items from the first streaming media service, the playlists associated with the second service provider user account, wherein the program instructions that are executable by the at least one processor such that the computing device is configured to receive the input data representing the selection of playlist of audio tracks from at least one particular streaming media service in the second set of streaming media services comprise program instructions that are executable by the at least one processor such that the computing device is configured to:

receive input data representing a selection from among the playlists associated with the second service provider user account.

5. The non-transitory computer-readable medium of claim 3, wherein the non-transitory computer-readable medium further comprises program instructions that are executable by the at least one processor such that the computing device is configured to:

while the first user account is selected in the control application, display first media items suggested by the first streaming media service according to first preferences of the first service provider user account; and while the second user account is selected in the control application, display second media items suggested by the first streaming media service according to second preferences of the second service provider user account, wherein the program instructions that are executable by the at least one processor such that the computing device is configured to receive the input data representing the selection of playlist of audio tracks from at least one particular streaming media service in the second set of streaming media services comprise program instructions that are executable by the at least one processor such that the computing device is configured to:

receive input data representing a selection from among the second media items suggested by the first streaming media service.

6. The non-transitory computer-readable medium of claim 3, wherein the non-transitory computer-readable medium further comprises program instructions that are executable by the at least one processor such that the computing device is configured to:

while the first user account is selected in the control application, display first Internet radio stations associated with the first service provider user account; and while the second user account is selected in the control application, display second Internet radio stations associated with the second service provider user account, wherein the program instructions that are executable by the at least one processor such that the computing device is configured to receive the input data representing the selection of playlist of audio tracks from at least one particular streaming media service in the second set of streaming media services comprise program instructions that are executable by the at least one processor such that the computing device is configured to:

receive input data representing a selection of a particular second Internet radio station.

7. The non-transitory computer-readable medium of claim 1, wherein the first set of streaming media services includes a first streaming media service and excludes a second streaming media service, wherein the second set of streaming media services includes the second streaming media service and excludes the first streaming media service, wherein the first user account is associated with a service provider user account of the first streaming media service, and wherein the second user account is associated with a service provider user account of the second streaming media service.

8. The non-transitory computer-readable medium of claim 7, wherein the non-transitory computer-readable medium further comprises program instructions that are executable by the at least one processor such that the computing device is configured to:

while the first user account is selected in the control application, display first custom playlists of media items from the first streaming media service, the playlists associated with the service provider user account of the first streaming media service; and while the second user account is selected in the control application, display second custom playlists of media items from the second streaming media service, the playlists associated with the service provider user account of the second streaming media service, wherein the program instructions that are executable by the at least one processor such that the computing device is configured to receive the input data representing the selection of playlist of audio tracks from at least one particular streaming media service in the second set of streaming media services comprise program instructions that are executable by the at least one processor such that the computing device is configured to:

receive input data representing a selection from among the second custom playlists of media items from the second streaming media service.

9. The non-transitory computer-readable medium of claim 7, wherein the non-transitory computer-readable medium further comprises program instructions that are executable by the at least one processor such that the computing device is configured to:

while the first user account is selected in the control application, display first media items suggested by the first streaming media service according to first preferences of the service provider user account of the first streaming media service; and while the second user account is selected in the control application, display second media items suggested by the second streaming media service according to second preferences of the service provider user account of the second streaming media service, wherein the program instructions that are executable by the at least one processor such that the computing device is configured to receive the input data representing the selection of playlist of audio tracks from at least one particular streaming media service in the second set of streaming media services comprise program instructions that are executable by the at least one processor such that the computing device is configured to:

receive input data representing a selection from among the second media items suggested by the second streaming media service.

10. The non-transitory computer-readable medium of claim 1, wherein the at least one particular zone comprises a first zone and a second zone, wherein the first zone and the second zone are configured in a synchrony group, wherein the program instructions that are executable by the at least one processor such that the computing device is configured to cause the at least one particular zone in the media playback system to play back the selected playlist of audio tracks comprises program instructions that are executable by the at least one processor such that the computing device is configured to:

cause at least one first playback device of the first zone to play back the selected playlist of audio tracks in synchrony with at least one second playback device of the second zone.

11. A computing system comprising:
a network interface configured to facilitate communication via at least one data network;
at least one processor; and
at least one non-transitory computer-readable medium comprising program instructions that are executable by the at least one processor such that the computing system is configured to:
while a first user account is selected in a control application configured to control a media playback system comprising playback devices that are connected to a local area network, cause display of a graphical user interface of the control application, the graphical user interface comprising (1) a first region comprising (i) an indication of a media playback system identifier corresponding to the media playback system and (ii) respective indications of each zone that is playing audio content in the media playback system, and wherein each zone includes at least one playback device and (2) a second region comprising respective indications of a first set of streaming media services that are accessible for streaming audio to the zones of the media playback system while the first user account is selected;
cause the graphical user interface to display a user account control selectable to select among multiple user accounts in the control application;
receive, via the user account control, input data representing a selection of a second user account;
switch the control application from selection of the first user account to selection of the second user account;
after the control application is switched from selection of the first user account to selection of the second user account, cause modification of the graphical user interface to display, in the second region in place of the respective indications of the first set of streaming media services, respective indications of a second set of streaming media services that are accessible for streaming audio to the zones of the media playback system while the second user account is selected, wherein the second set is different than the first set;
receive, via the graphical user interface, input data representing a selection of a playlist of audio tracks from at least one particular streaming media service in the second set of streaming media services; and
cause, via the network interface, at least one particular zone in the media playback system to play back the selected playlist of audio tracks, wherein, during playback, at least one given playback device in the at least particular one zone streams data streams representing the audio tracks from one or more servers of the at least one particular streaming audio service.

12. The computing system of claim 11, wherein the program instructions that are executable by the at least one processor such that the computing system is configured to cause the graphical user interface to display the user account control selectable to select among multiple user accounts in the control application comprise program instructions that are executable by the at least one processor such that the computing system is configured to:
cause the graphical user interface to display a drop-down menu comprising controls selectable to select respective user accounts.

13. The computing system of claim 11, wherein the first set of streaming media services includes a first streaming media service, wherein the second set of streaming media services includes the first streaming media service, wherein the first user account is associated with a first service provider user account of the first streaming media service, and wherein the second user account is associated with a second service provider user account of the first streaming media service.

14. The computing system of claim 13, wherein the at least one non-transitory computer-readable medium further comprises program instructions that are executable by the at least one processor such that the computing system is configured to:
while the first user account is selected in the control application, cause the graphical user interface to display first custom playlists of media items from the first streaming media service, the playlists associated with the first service provider user account; and
while the second user account is selected in the control application, cause the graphical user interface to display second custom playlists of media items from the first streaming media service, the playlists associated with the second service provider user account, wherein the program instructions that are executable by the at least one processor such that the computing system is configured to receive the input data representing the selection of playlist of audio tracks from at least one particular streaming media service in the second set of streaming media services comprise program instructions that are executable by the at least one processor such that the computing system is configured to:
receive input data representing a selection from among the playlists associated with the second service provider user account.

15. The computing system of claim 13, wherein the at least one non-transitory computer-readable medium further comprises program instructions that are executable by the at least one processor such that the computing system is configured to:
- while the first user account is selected in the control application, cause the graphical user interface to display first media items suggested by the first streaming media service according to first preferences of the first service provider user account; and
- while the second user account is selected in the control application, cause the graphical user interface to display second media items suggested by the first streaming media service according to second preferences of the second service provider user account, wherein the program instructions that are executable by the at least one processor such that the computing system is configured to receive the input data representing the selection of playlist of audio tracks from at least one particular streaming media service in the second set of streaming media services comprise program instructions that are executable by the at least one processor such that the computing system is configured to:
- receive input data representing a selection from among the second media items suggested by the first streaming media service.

16. The computing system of claim 13, wherein the at least one non-transitory computer-readable medium further comprises program instructions that are executable by the at least one processor such that the computing system is configured to:
- while the first user account is selected in the control application, cause the graphical user interface to display first Internet radio stations associated with the first service provider user account; and
- while the second user account is selected in the control application, cause the graphical user interface to display second Internet radio stations associated with the second service provider user account, wherein the program instructions that are executable by the at least one processor such that the computing system is configured to receive the input data representing the selection of playlist of audio tracks from at least one particular streaming media service in the second set of streaming media services comprise program instructions that are executable by the at least one processor such that the computing system is configured to:
- receive input data representing a selection of a particular second Internet radio station.

17. The computing system of claim 11, wherein the first set of streaming media services includes a first streaming media service and excludes a second streaming media service, wherein the second set of streaming media services includes the second streaming media service and excludes the first streaming media service, wherein the first user account is associated with a service provider user account of the first streaming media service, and wherein the second user account is associated with a service provider user account of the second streaming media service.

18. The computing system of claim 17, wherein the at least one non-transitory computer-readable medium further comprises program instructions that are executable by the at least one processor such that the computing system is configured to:
- while the first user account is selected in the control application, cause the graphical user interface to display first custom playlists of media items from the first streaming media service, the playlists associated with the service provider user account of the first streaming media service; and
- while the second user account is selected in the control application, cause the graphical user interface to display second custom playlists of media items from the second streaming media service, the playlists associated with the service provider user account of the second streaming media service, wherein the program instructions that are executable by the at least one processor such that the computing system is configured to receive the input data representing the selection of playlist of audio tracks from at least one particular streaming media service in the second set of streaming media services comprise program instructions that are executable by the at least one processor such that the computing system is configured to:
- receive input data representing a selection from among the second custom playlists of media items from the second streaming media service.

19. The computing system of claim 17, wherein the non-transitory computer-readable medium further comprises program instructions that are executable by the at least one processor such that the computing system is configured to:
- while the first user account is selected in the control application, cause the graphical user interface to display first media items suggested by the first streaming media service according to first preferences of the service provider user account of the first streaming media service; and
- while the second user account is selected in the control application, cause the graphical user interface to display second media items suggested by the second streaming media service according to second preferences of the service provider user account of the second streaming media service, wherein the program instructions that are executable by the at least one processor such that the computing system is configured to receive the input data representing the selection of playlist of audio tracks from at least one particular streaming media service in the second set of streaming media services comprise program instructions that are executable by the at least one processor such that the computing system is configured to:
- receive input data representing a selection from among the second media items suggested by the second streaming media service.

20. A method comprising:
- while a first user account is selected in a control application configured to control a media playback system comprising playback devices that are connected to a local area network, causing display of a graphical user interface of the control application, the graphical user interface comprising (1) a first region comprising (i) an indication of a media playback system identifier corresponding to the media playback system and (ii) respective indications of each zone that is playing audio content in the media playback system, and wherein each zone includes at least one playback device and (2) a second region comprising respective indications of a first set of streaming media services that are accessible for streaming audio to the zones of the media playback system while the first user account is selected;
- causing the graphical user interface to display a user account control selectable to select among multiple user accounts in the control application;

receiving, via the user account control, input data representing a selection of a second user account;

switching the control application from selection of the first user account to selection of the second user account;

after switching the control application from selection of the first user account to selection of the second user account, causing modification of the graphical user interface to display, in the second region in place of the respective indications of the first set of streaming media services, respective indications of a second set of streaming media services that are accessible for streaming audio to the zones of the media playback system while the second user account is selected, wherein the second set is different than the first set;

receiving, via the graphical user interface, input data representing a selection of a playlist of audio tracks from at least one particular streaming media service in the second set of streaming media services; and causing, via a network interface, at least one particular zone in the media playback system to play back the selected playlist of audio tracks, wherein, during playback, at least one given playback device in the at least one particular zone streams data streams representing the audio tracks from one or more servers of the at least one particular streaming audio service.

* * * * *